United States Patent [19]
Fujiwara et al.

[11] Patent Number: 5,298,593
[45] Date of Patent: Mar. 29, 1994

[54] METHOD OF PRODUCING THERMOTROPIC LIQUID CRYSTALLINE POLYESTER

[75] Inventors: Eisuke Fujiwara; Haruyo Kozaki, both of Inashiki, Japan

[73] Assignee: Mitsubishi Petrochemical Company, Ltd., Tokyo, Japan

[21] Appl. No.: 903,260

[22] Filed: Jun. 24, 1992

[30] Foreign Application Priority Data

Jun. 25, 1991 [JP] Japan ................................. 3-153204
Jun. 25, 1991 [JP] Japan ................................. 3-153205
Nov. 1, 1991 [JP] Japan ................................. 3-288036
Nov. 1, 1991 [JP] Japan ................................. 3-288037

[51] Int. Cl.$^5$ ..................... C08G 63/78; C08G 63/82; C08G 63/87
[52] U.S. Cl. .................... 528/277; 528/190; 528/193; 528/195; 528/272; 528/279; 528/282; 528/283
[58] Field of Search ............... 528/190, 193, 195, 272, 528/277, 282, 283, 279

[56] References Cited

U.S. PATENT DOCUMENTS

| | | |
|---|---|---|
| 3,804,805 | 4/1974 | Kuhfuss et al. ............... 528/195 |
| 3,890,256 | 6/1975 | McFarlane et al. . |
| 4,031,026 | 6/1977 | Ibbotson . |
| 4,448,938 | 5/1984 | Bruynincky et al. . |
| 4,743,626 | 5/1988 | Narayan . |
| 5,030,703 | 7/1991 | Pielartzik et al. ............... 528/193 |
| 5,081,211 | 1/1992 | Cassidy et al. . |

FOREIGN PATENT DOCUMENTS 968390 9/1964 United Kingdom .
0450652A3 10/1991 European Pat. Off. .
0450652A2 10/1991 European Pat. Off. .

OTHER PUBLICATIONS

Macromolecular Chemie, 187, 1145–1150 (1986), *Liquid crystalline polyesters with 1,4-cyclohexane units.*
Macromolecules 1988, 21, 2865–2869, *Thermotropic Liquid Crystalline Main-Chain Polyesters Containing Cyclooctyl Units. 4. Influence of the Methylene Spacer Length on the Nature of the Mesophase.*
Urethanes Technology, Apr./May 1992, "Dow Jumps In-Feet First-With New CFC-Free and Rim Shoe Sole Processes", pp., 24,26.

*Primary Examiner*—John Kight, III
*Assistant Examiner*—T. Mosley
*Attorney, Agent, or Firm*—Oblon, Spivak, McClelland, Maier & Neustadt

[57] ABSTRACT

A thermotropic liquid crystalline polyester is produced by carrying out polycondensation of ester monomer [I-2], an aromatic dicarboxylic acid [II] and an aromatic carboxylic acid [III-2]. The amounts of the compounds [I-2] and [II] are substantially equivalent and the amount of the compound [III-2] is not more than 20 times that of [I-2] by mole. A thermotropic liquid crystalline polyester having good heat resistance, fluidity and uniformity can be produced.

4 Claims, 1 Drawing Sheet

FIG. 1

METHOD OF PRODUCING THERMOTROPIC LIQUID CRYSTALLINE POLYESTER

BACKGROUND OF THE INVENTION

The present invention relates to a method of producing thermotropic liquid crystalline polyester (hereinafter referred to as LC polyester) and, more particularly, to a method of producing LC polyester having good heat resistance and good fluidity and uniformity.

Along with recent developments in the fields of electric, electronic and car industries, demands for plastics of higher capacity have increased, and a variety of plastics have been developed and provided on the market. Among them, a group of polymer compounds known as thermotropic liquid crystalline polymers, which exhibit optical anisotropy when melted, and in which the molecular chains are aligned in parallel, have been catching attention since they show good molding processability and improve the mechanical properties of the molded articles.

A typical LC polyester is a copolymer polyester made of only ester linkages of polyethylene terephthalate units and para hydroxy benzoic acid units (W. J. Jackson et al, J. Polym. Sci. Polym. Chem. Ed. Vol. 14, p. 2043 (1976), U.S. Pat. No. 3,804,805, and Japanese Patent Laid-Open Publication No. 51-8395).

In the above mentioned Japanese Patent Laid-Open Publication No. 51-8395, a method of producing a LC polyester by mixing polyethylene terephtharate units and para acetoxy benzoic acid units (hereinafter referred to as p-ABA) and heating them at 240°–300° C. to carry out polymerization, is described. It is known that increasing the content of p-ABA results in improvement of the heat resistance of the produced LC polyester, however, in this method, when the p-ABA component holds more than 75 mol % of the total aromatic group of the polymer, such a polymer considered to be produced by block polymerization of p-ABA, exists as an insoluble, infusible matter (comparative example 1), and the resulting LC polyester shows inferior fluidity, and lowered moldability. The generation of such foreign matter is also confirmed by the existence of a large amount of insoluble substances, when such a polymer is dissolved in a good solvent.

SUMMARY OF THE INVENTION

Accordingly, an object of the present invention is to provide methods of producing a LC polyester having good heat resistance, fluidity, and uniformity.

A first method of the present invention is a process of producing a thermotropic liquid crystalline polyester characterized by carrying out polycondensation of an ester monomer represented by formula [I-2], an aromatic dicarboxylic acid compound represented by formula [II], the amount of which is substantially equivalent to the ester monomer, and an aromatic carboxylic acid compound represented by formula [III-2], the amount of which is not more than 20 times that of the ester monomer by mole.

A second method of the present invention is a process of producing a thermotropic LC polyester characterized in that an ester monomer represented by formula [I], an aromatic dicarboxylic acid compound represented by formula [II], the amount of which is substantially equivalent to the ester monomer, an aromatic carboxylic acid compound represented by formula [III], the amount of which is not more than 20 times that of the ester monomer by mole, and an aliphatic carboxylic acid anhydride, are reacted to thereby carry out polycondensation.

The third method of the present invention is a process of producing a thermotropic liquid crystalline polyester comprising adding an aromatic dicarboxylic acid compound represented by formula [II] and an aromatic carboxylic acid compound represented by formula [III] to a reaction product containing an ester monomer represented by formula [I], which is obtained by reacting an aromatic carboxylic acid compound represented by formula [III'] with a diol compound represented by formula [IV], and carrying out polycondensation.

$Ar^1$, $Ar^2$ and $Ar^3$ are independently an aromatic hydrocarbon group of C6–18, and each includes, for example, phenylene groups, naphthylene groups, biphenylene groups, anthrylene groups, terphenylene groups etc, which may include a substituent such as an alkyl group, alkoxyl group, phenyl group or halogen atom etc.

$R^1$ is a saturated aliphatic hydrocarbon group of C1–15, and includes methylene group, ethylene group, propylene group, butylene group, pentylene group, hexylene group, heptylene group, octylene group, nonylene group, decylene group, undecylene group, dodecylene group, tridecylene group, tetradecylene group and pentadecylene group, and it may have either a linear or a cyclic form, and it may also include a branched chain.

$R^2$ and $R^3$ are independently a hydrocarbon group of C1-6, and each includes methyl groups, ethyl groups, propyl groups, butyl groups, pentyl groups, hexyl groups and phenyl groups.

$X^1$, $X^2$, $X^3$ and $X^6$ are independently a hydrogen atom or a saturated aliphatic hydrocarbon group of C1-10, and each includes hydrogen atoms, methyl groups, ethyl groups, propyl groups, butyl groups, pentyl groups, hexyl groups, heptyl groups, octyl groups, nonyl groups, and decyl groups, and they may have a linear or a cyclic form, and they may also include a branched chain.

$X^4$, $X^5$, $X^7$ and $X^8$ are independently a hydrogen atom or a group expressed as $R^4$—CO— (here $R^4$ is a hydrocarbon group of C1-6), and each includes, for example, hydrogen atoms, methylcarbonyl groups, ethylcarbonyl groups, n-propylcarbonyl groups, i-propylcarbonyl groups, n-butylcarbonyl groups, i-butylcarbonyl groups, t-butylcarbonyl groups, 1-methylpropylcarbonyl groups, pentylcarbonyl groups (having a linear or branched chain), hexylcarbonyl groups (having a linear, cyclic or branched chain), and phenylcarbonyl groups.

DETAILED DESCRIPTION OF THE INVENTION (1) The first method of the present invention is to carry out polycondensation of an ester monomer [I-2], an aromatic dicarboxylic acid compound [II], the amount of which is substantially equivalent to the ester monomer, and an aromatic carboxylic acid compound [III-2], which is not more than 20 times that of the ester monomer by mole.

RAW MATERIALS (A) Ester monomer [I-2]

The ester monomer of the formula [I-2] used in the first method of the present invention can be produced by any pertinent ester linkage formation process from a diol compound of the formula [IV] and an aromatic carboxylic acid compound of the formula [III'].

Examples of the diol compound [IV] include, a chain diol such as ethylene glycol, 1,2-propanediol, 1,3-propanediol, 1,2-butanediol, 1,3-butanediol, 1,4-butanediol, 2,3-butanediol, 1,5-pentanediol, 1,6-hexanediol, 1,7-heptanediol, 1,8-octanediol, 1,9-nonanediol, 1,10-decanediol etc and an alicyclic diol such as 1,4-cyclohexanediol, 1,4-cyclohexane dimethanol, tricyclodecane dimethanol, etc., and their alkyl esters or phenyl esters.

The aromatic carboxylic acid compound [III'] is a hydroxy aromatic carboxylic acid or its ester, or an acyloxy aromatic carboxylic acid or its ester. The position of the hydroxy group or acyloxy group may be either the meta or para position, but the para position is especially preferable. Examples for the aromatic carboxylic acid compound include 4-hydroxy benzoic acid, 4-acetoxy benzoic acid, 4-propioxy benzoic acid, 4-butyloxy benzoic acid, 4-valeroxy benzoic acid, 4-caproxy benzoic acid, 2-hydroxy-6-naphthoic acid, 2-acetoxy-6-naphthoic acid, 4-hydroxy-4'-biphenyl carboxylic acid, 4-acetoxy-4'-biphenyl carboxylic acid; methyl 4-hydroxy benzoate, ethyl 4-hydroxy benzoate, propyl 4-hydroxy benzoate, butyl 4-hydroxy benzoate, pentyl 4-hydroxy benzoate, hexyl 4-hydroxy benzoate, methyl 3-hydroxy benzoate, methyl 2-hydroxy benzoate, methyl 2-hydroxy-6-naphthoate, ethyl 2-hydroxy-6-naphthoate, propyl 2-hydroxy-6-naphthoate, butyl 2-hydroxy-6-naphthoate, pentyl 2-hydroxy-6-naphthoate, hexyl 2-hydroxy-6-naphthoate, methyl 1-hydroxy-4-naphthoate, methyl 1-hydroxy-5-naphthoate, methyl 1-hydroxy-6-naphthoate, methyl 2-hydroxy-7-naphthoate, methyl 4-hydroxy-4'-biphenyl carboxylate, ethyl 4-hydroxy-4'-biphenyl carboxylate, propyl 4-hydroxy-4'-biphenyl carboxylate, butyl 4-hydroxy-4'-biphenyl carboxylate, pentyl 4-hydroxy-4'-biphenyl carboxylate, hexyl 4-hydroxy-4'-biphenyl carboxylate, methyl 3-hydroxy-4'-biphenyl carboxylate, methyl 2-hydroxy-4'-biphenyl carboxylate, methyl 4-hydroxy-3'-biphenyl carboxylate, methyl 4-hydroxy-2'-biphenyl carboxylate, etc.

The production of an ester monomer [I-2] include, for example, direct esterification of a diol compound [IV] with an aromatic carboxylic acid compound [III'], or reacting at least either the diol compound [IV] or the aromatic carboxylic acid compound [III'] in its functional derivative form. In an example of the latter process, using diol as the diol compound [IV] and using an acyloxy aromatic carboxylic acid as the aromatic carboxylic acid compound [III'], the acyloxy aromatic carboxylic acid is made into an acid chloride and reacted with diol at the molar ratio of about 1:2, to carry out dehydrochlorination and produce the ester monomer.

(B) Aromatic dicarboxylic acid compound [II]

The aromatic dicarboxylic acid compound of the formula [II] is an aromatic dicarboxylic acid, or mono or dialkyl ester of the aromatic dicarboxylic acid and which includes, for example, terephthalic acid, isophthalic acid, 2,6-naphthalene dicarboxylic acid, 1,5-naphthalene dicarboxylic acid, 1,8-naphthalene dicarboxylic acid, 4,4'-biphenyl dicarboxylic acid, 4,4''-terphenylene dicarboxylic acid, 2,6-anthracene dicarboxylic acid, 1,5-anthracene dicarboxylic acid, 9,10-anthracene dicarboxylic acid and their alkyl esters etc. (C) Aromatic carboxylic acid compound [III-2]

The aromatic carboxylic acid compound of the formula [III-2], which is used for the first method of the present invention is an acyloxy aromatic carboxylic acid or its alkyl ester among the aromatic carboxylic acid compound [III']. Of course, it can be the same as or different from the aromatic carboxylic acid used for the production of the ester monomer [I]. The position of the acyloxy group can be either the meta or para position, but the para position is especially preferable.

Production of a liquid crystalline polyester

In the first method of the present invention, polycondensation of an ester monomer [I-2], an aromatic dicarboxylic acid compound [II] and an aromatic carboxylic acid compound [III-2] is carried out to produce a LC polyester.

The amount of the aromatic dicarboxylic acid compound [II] to be used is substantially equivalent to the ester monomer [I-2]. That is, the molar ratio of [I]/[II]=0.9-1.1, preferably 0.95-1.05.

The amount of the aromatic carboxylic acid compound [III-2] to be used is not more than 20 times, preferably not more than 17 times that of the ester monomer

[I] by mole, most preferably within the range 0.3–17 times by mole.

The polymerization reaction is carried out by charging the above mentioned raw materials (ester monomer [I-2], aromatic dicarboxylic acid compound [II], and aromatic carboxylic acid compound [III-2]) and maintaining the reaction temperature at 200°–350° C., preferably at 250°–325° C.

All of the raw materials can be put in at the same time and reacted, or a mixture of the raw materials can be added to the reaction system successively.

The reaction time depends on the reaction temperature, and it is about 7 hours in the case where the reaction temperature is gradually raised from 250° to 325° C., for example.

The polymerization is preferably carried out under an inactive gas flow. As the inactive gas, nitrogen or argon may be used, and it is preferably introduced to the system continuously.

As the polymerization reaction proceeds, elimination reaction occurs and compounds represented by formula [V-1]–[V-6] are generated.

| | |
|---|---|
| $X^1$-O-$R^2$ | [V-1] |
| $X^1$-O-$R^3$ | [V-2] |
| $X^2$-O-$R^2$ | [V-3] |
| $X^2$-O-$R^3$ | [V-4] |
| $X^3$-O-$R^2$ | [V-5] |
| $X^3$-O-$R^3$ | [V-6] |

The theoretical amounts of these compounds are distilled and removed from the system to complete the polycondensation reaction, but it is preferable to carry out the reaction under reduced pressured in the end. Illustratively, in the terminal period, the reaction is carried out at a degree of vacuum of not more than 1 mmHg for around 1 hour, and more preferably, followed by further reaction at a degree of vacuum of not more than 0.1 mmHg for about 0.5 hour.

In the LC polyester produced as above, the molar ratio of the structural unit corresponding to the formula [I-2] to the structural unit corresponding to the formula [II], i.e. [I-2]/[II] is 0.9–1.1 preferably 0.95–1.05. However, this does not necessarily mean that the liquid crystalline polymer is a block copolyester made of the polyester block consisting of the structural unit s[I-2] and [II], and the polyester block consisting of the structural unit [III-2]. That is the LC polyester produced as above includes not only the above mentioned block copolyester but also a random copolyester where each structure is bonded randomly. Though the term "randomly" is used, since each structural unit is bonded by an ester linkage, their arrangements naturally have some limitations.

(2) The second method of the present invention is to carry out reaction and polycondensation of an ester monomer [I], an aromatic dicarboxylic acid compound [II], the amount of which is substantially equivalent to the ester monomer, an aromatic carboxylic acid compound [III], which is not more than 20 times that of the ester monomer by mole, and an aliphatic carboxylic acid anhydride. Provided that, either or both $X^4$ in the ester monomer [I] or/and $X^5$ in the aromatic carboxylic acid compound [III] is/are a hydrogen atom.

That means, in the above mentioned first method, when both terminals of the molecular chain of the ester monomer [I-2] are hydroxyl groups and/or at least one of the terminals of the aromatic carboxylic acid compound [III-2] is a hydroxyl group, the hydroxyl group is esterified by the reaction with the aliphatic carboxylic acid anhydride, then polycondensation is carried out.

Examples of the aliphatic carboxylic acid anhydride as the esterification agent include acetic anhydride, propionic anhydride, butyric anhydride, etc.

The amount of the aliphatic carboxylic acid anhydride to be used is 0.8–2.0 (preferably 1.0–1.5) equivalent to the total amount of the hydroxyl group in the ester monomer [I] and in the aromatic carboxylic acid compound [III].

Aromatic carboxylic acids of the formula [III], expressed as the same meaning of the formula [III'], used in the method two of the present invention include hydroxy aromatic carboxylic acid or ester thereof or acyloxy aromatic carboxylic acid or ester thereof, such as p-acetoxy benzoic acid, p-propionoxy benzoic acid, p-butyloxy benzoic acid, p-valeroxy benzoic acid, p-caproxy benzoic acid, 2-acetoxy-6-naphthoeic acid, 4'-acetoxybiphenyl carboxylic acid, etc.

The production is analogous to the above mentioned first method, provided that an aliphatic carboxylic acid anhydride is added to the raw materials, and heated at reflux for 1–4 hours, to alkylesterify the hydroxyl group, and then reaction temperature is raised to carry out the polycondensation.

(3) The third method of the present invention is to add an aromatic dicarboxylic acid compound [II] and an aromatic carboxylic acid compound [III] to a reaction product containing an ester monomer [I] which is obtained by reacting an aromatic carboxylic acid compound [III'] with a diol compound [IV], and to carry out polycondensation.

Raw materials (A) Aromatic carboxylic acid compound [III'] The aromatic carboxylic acid ester of the formula [III'] is the same as that explained hereinbefore in (1) (A).

(B) Diol compound [IV] The diol compound of the formula [IV] is the same as that explained hereinbefore in (1)(A).

(C) Aromatic dicarboxylic acid compound [III] The aromatic dicarboxylic acid compound of the formula [II] is the same as in (1)(B).

(D) Aromatic carboxylic acid compound [III] The aromatic carboxylic acid compound of the formula [III] is the same in (2), which may be the same as or different from the aromatic carboxylic acid used as the compound of the formula [III'].

Production of a liquid crystalline polyester

In this method, (1) to a reaction product including an ester monomer [I] which is obtained by reacting (A) an aromatic carboxylic acid compound [III'] and (B) a diol compound [IV], (2) (C) an aromatic dicarboxylic acid compound [II] and (D) an aromatic carboxylic acid compound [III] are added and polycondensation is carried out.

(1) Reaction between (A) an aromatic carboxylic acid compound [III'] and (B) a diol compound [IV]

This reaction may be carried out by any pertinent process regarding formation of an ester linkage. Direct esterification can be done between the aromatic carboxylic acid compound [III'] and the diol compound [IV], or at least either the diol compound [IV] or the aromatic carboxylic acid compound [III'] can be reacted in its functional derivative form.

In a particular example of the latter case, diol is used as the diol compound [IV] ($X^7$, $X^8$=H), and an acyloxy aromatic carboxylic acid is used as the aromatic carboxylic acid compound [III']($X^4$=$R^4$—CO—, $X^6$=H), and the acyloxy aromatic carboxylic acid is made into acid chloride, and dehydrochlorination is carried out at the molar ratio of the acyloxy aromatic carboxylic acid [III']/diol [IV] of 2.5–2 (presence of excessive aromatic carboxylic acid compound [III']). (For more details, see the above mentioned (1)(A): Production of an ester monomer).

In another particular example, diol is used as the diol compound [IV] ($X^7$, $X^8$=H), a hydroxy aromatic carboxylate is used as the aromatic carboxylic acid compound [III']($X^4$=H, $X^6$=a saturated aliphatic hydrocarbon group of 1-10C), and diol and hydroxy aromatic carboxylate are put in, then a metal compound catalyst is added and heated to carry out the reaction.

The molar ratio of the hydroxy aromatic carboxylate [III'] to the diol [IV] is 0.1–2.0 preferably 0.5–2.0 (presence of excessive diol compound [IV]).

The metal compound catalyst includes an aluminate, aluminium compound, tin compound, magnesium compound, calcium compound, germanium compound, lead compound and titanium compound including an alkoxy, aryl, acyloxy and alkyl group of 1–6C etc.

Titanium compounds include tetra-n-butyl titanate, tetraisopropoxide titanate, titanium butoxide, tetra-2-ethylhexyl titanate etc.

Aluminium compounds include trimethyl aluminium, triethyl aluminium, diethyl aluminium chloride, etc.

Tin compounds include di-n-butyl tin oxide, di-n-butyl tin dilaurate, di-n-butyl tin diacetate, etc.

Magnesium compounds include magnesium acetate, magnesium chloride, magnesium oxide, methyl magnesium chloride, ethyl magnesium chloride, propyl magnesium chloride, methyl magnesium bromide, ethyl magnesium bromide, propyl magnesium bromide, etc.

Calcium compounds include calcium acetate, calcium carbonate, calcium phosphate, calcium oxide, etc.

Germanium compounds include germanium oxide, germanium chloride, etc.

Lead compounds include tetraethyl lead, tetrapropyl lead and tetrabutyl lead etc.

The aluminate includes calcium aluminate, barium aluminate, beryllium aluminate, and strontium aluminate, etc.

The amount of the above mentioned metal compound catalyst to be used is 0.001–10% by weight (preferably 0.05–1% by weight) of the total amount of the aromatic carboxylic acid compound [III'] and the diol compound [IV].

The reaction temperature is 150°–275° C., preferably 180°–250° C.

The reaction pressure is within a range of 0.01 mm Hg–10 atm.

The reaction time depends on the reaction temperature etc, when the reaction temperature is 180°–250° C., it is about 5–12 hours.

The reaction is preferably carried out under an inactive gas flow. As the inactive gas, nitrogen and argon may be used and it is preferably introduced continuously into the system.

As the reaction proceeds, alcohol expressed as the following general formula [V] is eliminated.

$$X^6\text{—OH} \qquad [V]$$

A theoretical amount of this alcohol and an excess amount of diol [IV], when the reaction is carried out under the presence of an excessive amount of diol, are required to be removed from the system, and from the view point of the reaction time as well, it is preferable to carry out the second half of the reaction under a reduced pressure. Illustratively, the second half of the reaction is carried out for about 1–6 hours at a degree of vacuum of not more than 1 mmHg.

The reaction is completed by removing the theoretical amount of alcohol and the excessive amount of diol from the system.

(2) Polycondensation

Following the above mentioned reaction, an aromatic dicarboxylic acid compound [II] and an aromatic carboxylic acid compound [III] are added to the obtained reaction product containing the ester monomer [I], and polycondensation is carried out to produce a LC polyester.

The amount of the aromatic dicarboxylic acid compound [II] to be used is 0.4–1 times by mole, preferably 0.6–1 times by mole of the theoretical amount of the reaction product between the aromatic carboxylic acid compound [III'] and the diol compound [IV].

That is, when an excessive amount of diol compound [IV] is used, it is 0.2–0.5 times by mole of the aromatic carboxylic acid compound [III'], preferably 0.3–0.5 times by mole, and when an excessive amount of aromatic carboxylic acid compound [III'] is used, it is 0.4–1 times by mole (preferably 0.6–1 times by mole) of the diol compound [IV].

The amount of the aromatic carboxylic acid compound [III] to be used is not more than 20 times, preferably not more than 17 times by mole of the theoretical amount of the reaction product between the aromatic carboxylic acid compound [III'] and the diol compound [IV], and most preferably it is 0.3–17 times by mole. That is, when an excessive amount of diol compound [IV] is used, it is not more than 10 times by mole of the aromatic carboxylic acid compound [III'], preferably 0.15–8.5 times by mole, and when an excessive amount of aromatic carboxylic acid compound [III'] is used, it is not more than 20 times by mole, preferably 0.3–17 times by mole of the diol compound [IV].

The polycondensation reaction is carried out by putting in the raw materials (the reaction product between an aromatic carboxylic acid compound [III'] and a diol compound [IV], an aromatic dicarboxylic acid compound [II] and an aromatic carboxylic acid compound [III]), and setting the reaction temperature at 200°–350° C., preferably at 250°–325° C.

The reaction time of the polycondensation reaction depends on the reaction temperature, and it is about 5–10 hours in the case where the reaction temperature is gradually raised from 250° C. to 325° C.

The polycondensation reaction is preferably carried out under an inactive gas flow. As the inactive gas, nitrogen or argon may be used, and it is preferably introduced into the system continuously.

As the polycondensation reaction proceeds, an aliphatic carboxylic acid is by-produced.

In the terminal period of the polycondensation reaction, the by-produced aliphatic carboxylic acid must be efficiently removed. From the view point of the reaction time as well, it is preferable to carry out the reaction under reduced pressure in the end. Illustratively, the terminal period of the reaction is carried out for 1–5 hours at a degree of vacuum of not more than 1 mmHg, preferably followed by reaction at a degree of vacuum of not more than 0.1 mmHg for about 0.1–1 hour.

The reaction is completed by removing the theoretical amount of the by-produced aliphatic carboxylic acid from the system.

When at least one of either $X^4$ in the ester monomer [I] or $X^5$ in the aromatic carboxylic acid compound [III] is a hydrogen atom, that is, when at least both terminals of the molecular chain of the ester monomer [I] or one of the substituting groups of the aromatic carboxylic acid compound [III] are comprised of a hydroxyl group, prior to the polycondensation reaction, it must be reacted with an aliphatic carboxylic acid anhydride to esterify the hydroxyl group(s).

In such a case, the aliphatic carboxylic acid anhydride, as an esterifying agent includes, for example, acetic anhydride, propionic anhydride and butyric anhydride.

The amount of the aliphatic carboxylic acid anhydride to be used is 0.8–2.0 (preferably 1.0–1.5) equivalent to the total amount of the hydroxyl group in the ester monomer [I] and the aromatic carboxylic acid compound [III].

The esterification is carried out by adding the aliphatic carboxylic acid anhydride to the raw materials, and heating it at reflux for about 1–4 hours. The hydroxy terminal must be completely esterified, and the degree of the esterification can be confirmed by hydroxy value measurement etc.

The esterification reaction is preferably carried out under an inactive gas flow. As the inactive gas, nitrogen, argon, etc can be used, and it is preferably introduced into the system continuously.

In a further illustrative example, when both $X^4$ of the ester monomer [I] and $X^5$ of the aromatic carboxylic acid compound [III] are hydrogen atoms, the raw materials (the reaction product between the aromatic carboxylic acid compound [III'] and the diol compound [IV], the aromatic dicarboxylic acid compound [II] and the aromatic carboxylic acid compound [III]) and a pre-determined amount of the aliphatic carboxylic acid anhydride are put in and polycondensation is carried out at a reaction temperature of 200°–350° C., preferably at 250°–325° C.

When $X^4$ of the ester monomer [I] is a hydrogen atom, while $X^5$ of the aromatic carboxylic acid compound [III] is $R^4$—CO—, it is also possible that the reaction product of the aromatic carboxylic acid compound [III'] and the diol compound [IV] and a pre-determined amount of the aliphatic carboxylic acid anhydride are put in, and after the hydroxyl groups of the reaction product are alkylesterified, the aromatic dicarboxylic acid compound [II] and the aromatic carboxylic acid compound [III] are added to carry out the polycondensation reaction at a reaction temperature of 200°–350° C., preferably at 250°–325° C.

When an aliphatic carboxylic acid anhydride is used as the esterification agent, the by-produced aliphatic carboxylic acid and the excess amount of the aliphatic carboxylic acid anhydride must be efficiently removed in the terminal stage of the polycondensation reaction, and the reaction is preferably carried out under reduced pressure in the end, in view such points as reaction time.

In the LC polyester produced in accordance with the present invention, the molar ratio of the structural unit of the hydroxy benzoic acid (corresponding to $Ar^1 + Ar^3$) to the total number of moles of the aromatic group (corresponding to $Ar^1 + Ar^2 + Ar^3$) is 67–96%, preferably 70–95%.

The LC polyester produced in accordance with the present invention must have a sufficiently large molecular weight. The LC polyester will have an intrinsic viscosity measured with pentafluorophenol as the solvent of not less than 0.4, preferably more than 0.6, the liquid crystal initiation temperature being not less than 150° C., and preferably more than 180° C.

The LC polyester produced in accordance with the present invention, can be molded with normal melt molding processes such as injection molding, extrusion molding, compression molding and blow molding, and can be processed into three dimensional molded articles, films, fibers, containers, etc. It can be mixed with another thermoplastic resins to produce polymer alloys.

When it is molded, such additives as reinforcing materials including glass fibre and carbon fibre, fillers, antioxidants, stabilizers, plasticizers, and mold releasing agents can be added to the LC polyester of the present invention to render desired characteristics to the molded article.

According to the production method of the present invention, there is provided a LC polyester which can contain a large amount of p-ABA structural unit, show high uniformity and good fluidity as well as good heat resistance.

DESCRIPTION OF THE PREFERRED EXAMPLES

Some illustrative examples will now be described in an effort to enhance understanding but not limit the scope of the invention.

Measurements of intrinsic viscosity, logarithmic viscosity, thermal weight loss starting temperature by thermogravimetric analysis (TGA), fluidity starting temperature and observation of the condition of liquid crystal of the copolyester are done as follows.

(1) Intrinsic viscosity (Examples 1–18)

Intrinsic viscosity was measured in a mixed solvent of phenol/1,1,2,2-tetrachloroethane of 1/1 (by weight) at 30° C. using Ubbelohde viscometer.

For substances not dissolved under the above mentioned conditions, logarithmic viscosity was measured in pentafluorophenol (hereinafter abbreviated as PFP), or p-chlorophenol (abbreviated as p-CIP in the following tables) at 50° C. The dash (—) in the table shows that the substance was not dissolved by either of the solvents.

(2) Logarithmic viscosity (Examples 19–56)

Logarithmic viscosity was measured at 50° C. in pentafluorophenol as the solvent using Ubbelohde viscometer. The dash (—) in the table shows that the substance was not dissolved in pentafluorophenol.

(3) Thermal weight loss starting temperature using thermogravimetric analysis (TGA)

Thermogravimetric analysis (TGA) was carried out in nitrogen with the temperature being raised at a rate of 10° C./min using TG/DTA20 from SEIKO I&E.

(4) Fluidity starting temperature and liquid crystal state

The fluidity starting temperature and liquid crystal state were confirmed by polarization microscope with a hot stage from Nicon.

REFERENCE EXAMPLE 1

Synthesis of p-acetoxy benzoic acid chloride

P-acetoxy benzoic acid 180.16 g (1.0 mol) was added to thionylchloride 500 ml, and dimethylformamide (DMF) 1 ml was dropped in as a catalyst and stirred, and when generation of hydrogen chloride and sulfur dioxide stopped and the reaction liquid cleared, p-acetoxy benzoic acid 180.16 g (1.0 mol) was added another 5 times, i.e. a total of 6.0 mol was added. After all 6.0 mol of the p-acetoxy benzoic acid was added and when the generation of hydrogen chloride and sulfur dioxide stopped, and the reaction liquid cleared, it was heated at reflux for 3 hours, then it was distilled and purified (at 173° C., 10 mmHg).

REFERENCE EXAMPLE 2

Synthesis of ester monomer [I] of cyclohexane dimethanol

Cyclohexane dimethanol 194.684 g (1.35 mol), pyridine 242.64 ml (3.0 mol), and acetone 1000 ml were cooled to below 20° C. under argon gas flow.

P-acetoxy benzoic acid chloride 595.821 g (3.0 mol) was carefully dropped into it so that the temperature of the reaction liquid did not exceed 20° C.

After the dropping, it was stirred at room temperature for 2 hours then at 60° C. for 2 hours, left to stand, then poured into distilled water and filtered. The filtered crystal left on filter paper was washed twice with water, and twice with methanol, and dried, then re-crystallized from dioxane, filtered and dried to give an ester monomer of cyclohexane 545.21 g (1.164 mol, 86.2%).

REFERENCE EXAMPLE 3

Synthesis of ester monomer [I] of ethylene glycol

Ethylene glycol 27.932 g (0.45 mol), pyridine 80.88 ml (1.0 mol), acetone 500 ml were cooled to below 20° C. under argon gas flow. P-acetoxy benzoic acid chloride 198.607 g (1.0 mol) was carefully dropped into it so that the temperature of the reaction liquid did not exceed 20° C.

After the dropping, it was stirred at room temperature for 2 hours then at 60° C. for 2 hours, left to stand, then poured into distilled water and separated. The solvent of the upper organic phase was evaporated and the obtained crystal was re-crystallized from methanol, filtered and dried to give an ester monomer of ethylene glycol 140.06 g (0.36 mol, 80.56%).

REFERENCE EXAMPLE 4

Synthesis of ester monomer [I] of butanediol

Butanediol 40.554 g (0.45 mol), pyridine 80.88 ml (1.0 mol), acetone 500 ml were cooled to below 20° C. under argon gas flow. P-acetoxy benzoic acid chloride 198.607 g (1.0 mol) was carefully dropped into it so that the temperature of the reaction liquid did not exceed 20° C.

After the dropping, it was stirred at room temperature for 2 hours then at 60° C. for 2 hours, left to stand, then poured into distilled water and filtered. The filtered crystal left on the filter paper was washed twice with water, and twice with methanol, and re-crystallized from methanol, filtered and dried to give an ester monomer of budanediol 158.51 g (0.38 mol, 85.00%).

EXAMPLE 1

93.70 g (0.2 mol) of an ester monomer [I] of cyclohexane dimethanol produced in Reference Example 2, 36.032 g (0.2 mol) of p-acetoxy benzoic acid [III], and 33.228 g (0.20 mol) of terephthallic acid [II] were put in a 300 ml separable flask, having a stirrer, a thermometer, a distillate tube, and an argon introduction tube. After purging the system with argon three times, the metal bath was heated to 200° C. and the content was heated for 30 minutes and melted. Stirring was started and the reaction was carried out for 2 hours keeping the metal bath at 250° C., 2 hours at 275° C., 2 hours at 300° C., and 1 hour at 325° C. when 33.0 ml of acetic acid, which is nearly 90% of the theoretical amount of 34.35 ml, was distilled.

The reaction was further continured under reduced pressure of below 1 mmHg at 325° C. for 30 minutes, and the theoretical amount of acetic acid was distilled.

After the polymerization was completed, the contents were taken out of the separable flask while still hot.

Figure 1:
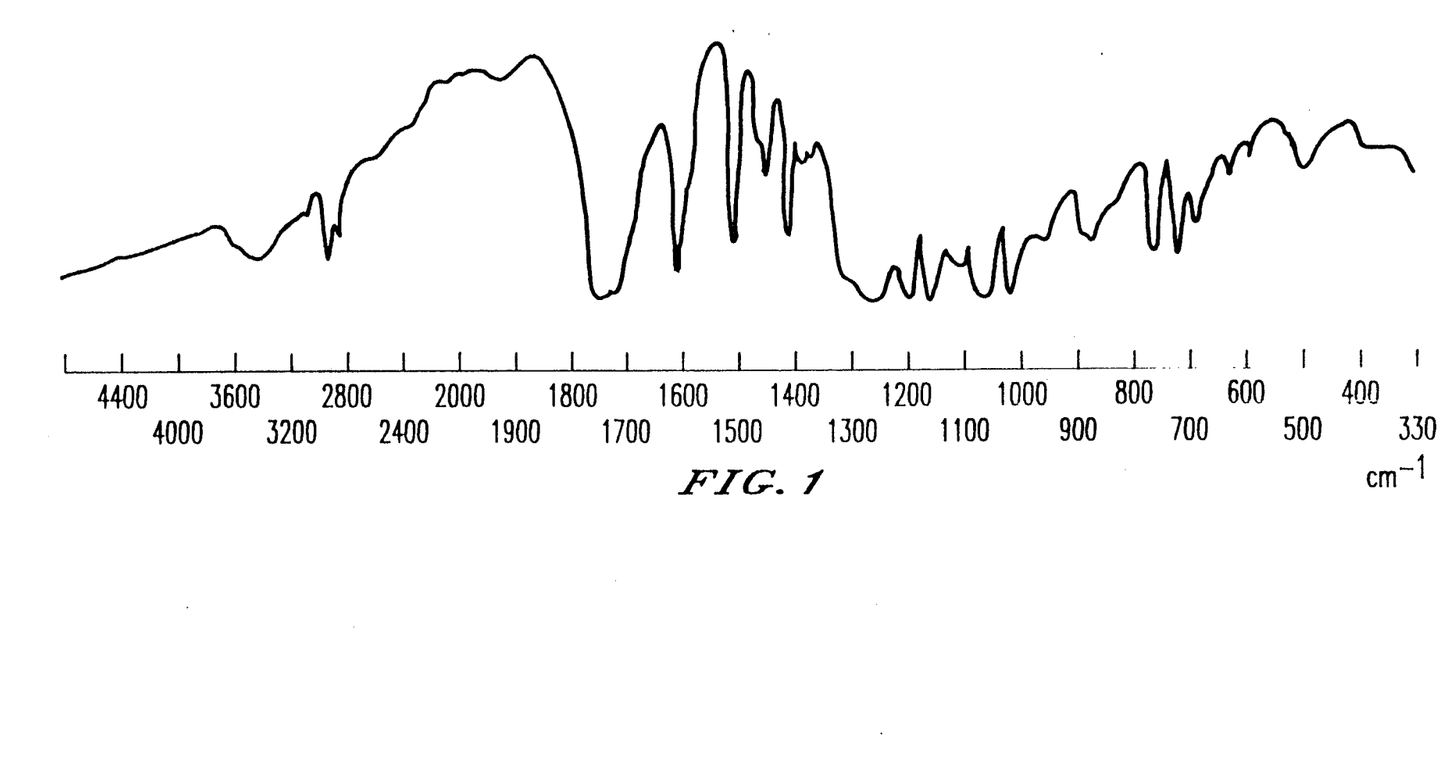
FIG. 1 is an infrared spectrum of a liquid crystalline polymer obtained in accordance with the following Example 1.

The polymer was observed by polarization microscope with a hot stage and its melt anisotropy was confirmed. The physical properties of the liquid crystalline polymer are shown in Table 1. The infrared spectrum of the obtained liquid crystalline polymer is shown in FIG. 1.

EXAMPLES 2-5

Polymerizations analogous to that described in Example 1 were carried out except that a different molar ratio of starting materials was employed. The results are shown in Table 1.

TABLE 1

| Examples No. | a/b/c (molar ratio) (p-HBA %)* | intrinsic viscosity [η] | fluidity starting temperature (°C.) | TGA (°C.) |
|---|---|---|---|---|
| 1 | 1/1/1 (75.0%) | 0.549 | 235 | 404.6 |
| 2 | 1/2/1 (80.0%) | 0.580 | 190 | 403.6 |
| 3 | 1/4/1 (85.7%) | 0.867 (PFP) | 270 | 410.1 |
| 4 | 1/8/1 (90.9%) | — | 348 | 413.0 |
| 5 | 1/0/1 (66.7%) | 0.377 | 270 | 391.3 | a) ester monomer of cyclohexane dimethanol
b) p-acetoxy benzoic acid
c) terephthalic acid
*the molar ratio (%) of p-hydroxy benzoic acid unit (corresponding to $Ar^1 + Ar^2$) to the total number of moles of the aromatic group (corresponding to $Ar^1 + Ar^2 + Ar^3$).

EXAMPLE 6

A liquid crystalline polymer was obtained by using a procedure analogous to that described in Example 1, but replacing the ester monomer of cyclohexane dimethanol with 77.272 g (0.2 mol) of the ester monomer of ethylene glycol produced in Reference Example 3. The polymer was observed by polarization microscope with a hot stage and its melt anisotropy was confirmed. The physical properties of the liquid crystalline polymer are shown in Table 2.

EXAMPLES 7-10

Polymerizations analogous to that described in Example 6 was carried out using a different molar ratio of the starting materials. The results are shown in Table 2.

TABLE 2

| Examples No. | d/e/f (molar ratio) (p-HBA %) | intrinsic viscosity [η] | fluidity starting temperature (°C.) | TGA (°C.) |
|---|---|---|---|---|
| 6  | 1/1/1 (75.0%) | 0.311 (p-ClP) | 230 | 417.3 |
| 7  | 1/2/1 (80.0%) | 0.321 (PFP)   | 245 | 422.0 |
| 8  | 1/4/1 (85.7%) | 1.476 (PFP)   | 290 | 429.0 |
| 9  | 1/8/1 (90.9%) | —             | 335 | 426.9 |
| 10 | 1/0/1 (66.7%) | 0.363         | 170 | 413.4 | d) ester monomer of ethylene glycol
e) p-acetoxy benzoic acid
f) terephthalic acid

EXAMPLE 11

A liquid crystalline polymer was obtained by using a procedure analogous to that described in Example 1, but replacing the ester monomer of cyclohexane dimethanol with 82.883 g (0.2 mol) of the ester monomer of butanediol produced in Reference Example 4. The polymer was observed by polarization microscope with a hot stage and its melt anisotropy was confirmed. The physical properties of the liquid crystalline polymer are shown in Table 3.

EXAMPLES 12-15

Polymerizations analogous to that described in Example 11 was carried out using a different molar ratio of the starting materials. The results are shown in Table 3.

TABLE 3

| Examples No. | g/h/i (molar ratio) (p-HBA %) | intrinsic viscosity [η] | fluidity starting temperature (°C.) | TGA (°C.) |
|---|---|---|---|---|
| 11 | 1/1/1 (75.0%) | 0.272 (p-ClP) | 160 | 377.0 |
| 12 | 1/2/1 (80.0%) | 0.364         | 200 | 383.7 |
| 13 | 1/4/1 (85.7%) | 0.826 (p-ClP) | 250 | 385.4 |
| 14 | 1/8/1 (90.9%) | —             | 320 | 386.1 |
| 15 | 1/0/1 (66.7%) | 0.225 (p-ClP) | 260 | 378.0 | g) ester monomer of butanediol
h) p-acetoxy benzoic acid
i) terephthalic acid

EXAMPLE 16

A liquid crystalline polymer (p-HBA %=80%) was obtained by using a procedure analogous to that described in Example 1, but replacing the ester monomer of cyclohexane dimethanol with 57.954 g (0.15 mol) of the ester monomer of ethylene glycol produced in Reference Example 3 and replacing terephthalic acid with 32.429 g (0.15 mol) of 2,6-naphthalene dicarboxylic acid. The polymer was observed by polarization microscope with a hot stage and its melt anisotropy was confirmed. The liquid crystalline polyester was not dissolved in any of such solvents as phenol/1,1,2,2-tetrachloroethane of 1/1 (by weight), pentafluorophenol or parachlorophenol, and the limiting viscosity [η] could not be measured. The fluidity starting temperature was 260° C. and the TGA was 433.0° C.

EXAMPLE 17

A liquid crystalline polymer (p-HBA %=80%) was obtained by using a procedure analogous to that described in Example 1, but replacing the ester monomer of cyclohexane dimethanol with 57.954 g (0.15 mol) of the ester monomer of ethylene glycol produced in Reference Example 3 and replacing the terephthalic acid with 36.335 g (0.15 mol) of 4,4'-biphenyl dicarboxyic acid. The polymer was observed by polarization microscope with a hot stage and its melt anisotropy was confirmed. The liquid crystalline polyester was not dissolved in any of such solvents as phenol/1,1,2,2-tetrachloroethane of 1/1 (by weight), pentafluorophenol or parachlorophenol, and the limiting viscosity [η] could not be measured. The fluidity starting temperature was 275° C. and the TGA was 428.9° C.

EXAMPLE 18

77.272 g (0.2 mol) of an ester monomer of ethylene glycol produced in the reference example 3, 27.624 g (0.2 mol) of p-hydroxy benzoic acid, 33.228 g (0.2 mol) of terephthalic acid, and 22.46 g (0.22 mol) of acetic anhydride were put in a separable flask of 300 ml, having a stirrer, a thermometer, a distillate tube, and an argon introduction tube (p-HBA %=75.0%). After purging the system with argon three times, the metal bath was set at 160° C. and the contents were heated at reflux for 2 hours to acetylate all of the hydroxyl groups. Then the reaction was carried out for 2 hours keeping the metal bath at 250° C., then 2 hours at 275° C., 2 hours at 300° C., and 1 hour at 325° C. when acetic acid (nearly 90% of the theoretical amount) was distilled.

The reaction was further continued under reduced pressure of below 1 mmHg at 325° C. for 30 minutes, and the theoretical amount of acetic acid was distilled.

After the polymerization was completed, the contents were taken out of the separable flask while it was hot.

The polymer was observed by polarization microscope with a hot stage and its melt anisotropy was confirmed. The liquid crystalline polyester had a limiting viscosity [η] of 0.631, a fluidity starting temperature of 238° C. and a TGA of 405.4° C.

COMPARATIVE EXAMPLE 1

63.99 g (0.333 mol) of polyethylene terephthalate and 120.11 g (0.667 mol) of p-acetoxy benzoic acid were put in a reactor analogous to that used in Example 1. After purging the system with argon three times, the metal bath was set at 200° C. and the contents were heated for 30 minutes and melted.

Stirring was then started and the reaction was carried out for 2 hours keeping the metal bath at 250° C., then for 1 hour at 275° C., the white solid substance was not dissolved in a mixed solvent of phenol/1,1,2,2-tetrachloroethane of 1/1 (by wright), p-chlorophenol, or pentafluorophenol, and the intrinsic viscosity could not be measured. An insoluble substance was found at the fluidity starting temperature and no homogeneous liquid crystalline phase was obtained.

COMPARATIVE EXAMPLE 2

73.41 g (0.333 mol) of polybutylene terephthalate and 120.11 g (0.667 mol) of p-acetoxy benzoic acid were put in a reactor analogous to that used in Example 1. After purging the system with argon three times, the metal bath was set at 200° C. and the contents were heated for 30 minutes and melted.

Stirring was then started and the reaction was carried out for 2 hours keeping the metal bath at 250° C., then for 1 hour at 275° C. to precipitate a white solid substance.

The white solid substance was not dissolved in a mixed solvent of phenol/1,1,2,2-tetrachloroethane of 1/1 (by wright), p-chlorophenol, or pentafluorophenol, and the intrinsic viscosity could not be measured. An insoluble substance was found at the fluidity starting temperature and no homogeneous liquid crystalline phase was obtained.

EXAMPLE 19

Ester exchange reaction 60.8604 g (0.4 mol) of methyl hydroxy benzoate, 37.242 g (0.6 mol) of ethylene glycol and 0.1 g (0.1% by weight of the total amount of the raw materials) of titanium (IV) tetrabutoxide were put in a separable flask of 300 ml, having a stirrer, a thermometer, a distillate tube, and an argon introducing tube. After purging the reaction system with argon three times, a heating mantle was set at 200° C. and the contents were heated for 30 minutes and melted. Then stirring was started and the reaction was carried out for 30 minutes keeping the heating mantle at 225° C., then 3.5 hours at 250° C. when a theoretical amount of methanol and nearly 70% of the theoretical amount of the excessive ethylene glycol were distilled.

The reaction was further continued under reduced pressure of below 1 mmHg at 250° C. for 6 hours, and the theoretical amount of ethylene glycol was distilled.

Polycondensation

The reaction product obtained in the above mentioned reaction was not separated and 33.228 g (0.2 mol) of terephthalic acid, 55.228 g (0.4 mol) of p-hydroxy benzoic acid and 83.18 ml (0.88 mol, 1.1 equivalent amount) of acetic anhydride were added to it in the same separable flask (p-HBA %=80.0), and heated at 180° C. at reflux for 2 hours, to acetylate all of the terminal hydroxyl groups.

Then the reaction was carried out at 200° C. for 1 hour, at 250° C. for 1 hour, at 275° C. for 2 hours, at 300° C. for 2 hours, then at 325° C. for 1 hour, when about 90% of a theoretical amount of acetic acid was distilled. The reaction was further carried out under a reduced pressure of below 1 mmHg at 325° C. for 30 minutes, and the theoretical amount of acetic acid was distilled.

After the polycondensation was completed, the contents were taken out of the separable flask while it was hot.

The polymer was observed by polarization microscope with a hot stage and its melt anisotropy was confirmed. The physical properties of the liquid crystalline polyester are shown in Table 4.

EXAMPLES 20–23

Reactions analogous to that described in Example 19 were carried out except that the amount of acetic anhydride was changed. The results are shown in Table 4.

TABLE 4

| Example No. | amount of acetic anhydride | logarithmic viscosity | fluidity starting temperature (°C.) | TGA (°C.) |
|---|---|---|---|---|
| 19 | 1.1 | 0.831 | 240 | 411.8 |
| 20 | 1.5 | 0.489 | 150 | 410.9 |
| 21 | 1.0 | 0.599 | 180 | 411.9 |
| 22 | 0.9 | 0.663 | 220 | 409.0 |
| 23 | 0.8 | 0.612 | 220 | 413.2 |

EXAMPLES 24, 25

Reactions analogous to that described in Example 19 were carried out except that the final temperature of the ester exchange reaction was changed. The results are shown in Table 5.

TABLE 5

| Example No. | final temperature (°C.) | logarithmic viscosity | fluidity starting temperature (°C.) | TGA (°C.) |
|---|---|---|---|---|
| 24 | 225 | 0.543 | 210 | 414.0 |
| 25 | 275 | 0.639 | 220 | 409.5 |

EXAMPLES 26, 27

Reactions analogous to that described in Example 19 were carried out except that the final temperature of the polycondensation reaction was changed. The results are shown in Table 6.

TABLE 6

| Example No. | final temperature (°C.) | logarithmic viscosity | fluidity starting temperature (°C.) | TGA (°C.) |
|---|---|---|---|---|
| 26 | 300 | 0.631 | 220 | 398.9 |
| 27 | 350 | — | 240 | 403.0 |

EXAMPLES 28, 29

Reactions analogous to that described in Example 19 were carried out except that the catalyst for the ester exchange reaction was changed. The results are shown in Table 7.

TABLE 7

| Example No. | catalyst | logarithmic viscosity | fluidity starting temperature (°C.) | TGA (°C.) |
|---|---|---|---|---|
| 28 | Sn(CH$_3$CH$_2$CH$_2$CH$_2$)$_2$O | 0.622 | 250 | 410.5 |
| 29 | Ca(CH$_3$COO)$_2$H$_2$O | 0.621 | 250 | 419.5 |

EXAMPLES 30, 31

Reactions analogous to that described in Example 19 were carried out except that butandiol or cyclohexane dimethanol was used instead of ethylene glycol. The results are shown in Table 8.

TABLE 8

| Example No. | diol | logarithmic viscosity | fluidity starting temperature (°C.) | TGA (°C.) |
|---|---|---|---|---|
| 30 | butanediol | 0.723 | 210 | 408.7 |
| 31 | cyclohexane dimethanol | 0.792 | 195 | 410.2 |

EXAMPLES 32, 33

Reactions analogous to that described in Example 19 were carried out except that 4,4'-biphenyl dicarboxylic acid or 2,6-naphthalene dicarboxylic acid was used instead of terephthalic acid. The results are shown in Table 9.

TABLE 9

| Example No. | aromatic dicarboxylic acid | logarithmic viscosity | fluidity starting temperature (°C.) | TGA (°C.) |
|---|---|---|---|---|
| 32 | 4,4'-biphenyl dicarboxylic acid | — | 270 | 429.0 |
| 33 | 2,6-nephthalene dicarboxylic | — | 255 | 433.1 |

TABLE 9-continued

| Example No. | aromatic dicarboxylic acid | logarithmic viscosity | fluidity starting temperature (°C.) | TGA (°C.) |
|---|---|---|---|---|
| | acid | | | |

EXAMPLES 34

A reaction analogous to that described in Example 19 was carried out except that the amount of p-hydroxy benzoic acid was changed. The results are shown in Table 10.

TABLE 10

| Example No. | p-hydroxy benzoic acid (mol) | logarithmic viscosity | fluidity starting temperature (°C.) | TGA (°C.) |
|---|---|---|---|---|
| 34 | 0.8 | 1.363 | 290 | 429.7 |

EXAMPLES 35–42

Reactions analogous to that described in Example 19 were carried out except that the amount of terephthallic acid and the catalyst were changed. The results are shown in Table 11.

TABLE 11

| Example No. | catalyst | terephthallic acid (mol) (p-HBA %) | logarithmic viscosity | fluidity starting temp. (°C.) | TGA (°C.) |
|---|---|---|---|---|---|
| 35 | Ti[OCH(CH$_3$)$_2$]$_4$ | 0.15 (84.2) | 1.184 | 265 | 415.0 |
| 36 | Sn(CH$_3$CH$_2$CH$_2$CH$_2$)$_2$O | 0.15 (84.2) | 0.975 | 280 | 416.3 |
| 37 | Sn(CH$_3$CH$_2$CH$_2$CH$_2$)$_2$O | 0.10 (88.9) | 0.902 | 270 | 412.4 |
| 38 | C$_4$H$_9$SnOOH | 0.15 (84.2) | 0.788 | 270 | 415.6 |
| 39 | Ca(CH$_3$COO)$_2$H$_2$O | 0.17 (82.5) | 0.538 | ·260 | 417.4 |
| 40 | Ca(CH$_3$COO)$_2$H$_2$O | 0.15 (84.2) | 0.565 | 270 | 418.2 |
| 41 | Ca(CH$_3$COO)$_2$H$_2$O | 0.13 (86.0) | 0.549 | 270 | 417.1 |
| 42 | GeO$_2$ | 0.15 (84.2) | 0.786 | 250 | 412.4 |

EXAMPLE 43

Ester exchange reaction 60.8604 g (0.4 mol) of methyl hydroxy benzoate, 37.242 g (0.6 mol) of ethylene glycol and 0.1 g (0.1% by weight of the total amount of the raw materials) of titanium (IV) tetrabutoxide were put in a separable flask of 300 ml, having a stirrer, a thermometer, a distillate tube, and an argon introduction tube.

After purging the reaction system three times with argon, a heating mantle was set at 200° C. and the contents were heated for 30 minutes and melted. Then stirring was started and the reaction was carried out for 30 minutes keeping the heating mantle at 225° C., then 3.5 hours at 250° C., when a theoretical amount of methanol and nearly 70% of the theoretical amount of the excessive ethylene glycol were distilled.

The reaction was further continued under a reduced pressure of below 1 mmHg at 250° C. for 6 hours, and the theoretical amount of ethylene glycol was distilled.

Esterification

The reaction product obtained in the above mentioned reaction was not separated and 41.59 ml (0.44 mol, 1.1 equivalent amount) of acetic anhydride was added to it in the same separable flask, and heated at 180° C. at reflux for 2 hours, to acetylate the terminal hydroxyl groups.

Polycondensation 33.228 g (0.2 mol) of terephthallic acid and 72.064 g (0.4 mol) of p-acetoxy benzoic acid were added to the reaction product of the above mentioned reaction, and the reaction was carried out at 200° C. for 1 hour, at 250° C. for 1 hour, at 275° C. for 2 hours, at 300° C. for 2 hours, then at 325° C. for 1 hour, when about 90% of a theoretical amount of acetic acid was distilled.

The reaction was further carried out under a reduced pressure of below 1 mmHg at 325° C. for 30 minutes and the theoretical amount of acetic acid was distilled.

After the polycondensation was completed, the contents were taken out of the separable flask while it was hot.

The polymer was observed by polarization microscope with a hot stage and its melt anisotropy was confirmed. The physical properties of the liquid crystalline polyester are shown in Table 12.

EXAMPLES 44–46

Reactions analogous to that described in Example 43 were carried out except that the amount of acetic anhydride was changed. The results are shown in Table 12.

TABLE 12

| Example No. | amount of acetic anhydride | logarithmic viscosity | fluidity starting temperature (°C.) | TGA (°C.) |
|---|---|---|---|---|
| 43 | 1.1 | 0.602 | 239 | 411.9 |
| 44 | 1.5 | 0.351 | 155 | 410.0 |
| 45 | 1.0 | 0.413 | 178 | 411.9 |
| 46 | 0.9 | 0.496 | 215 | 409.0 |

EXAMPLES 47, 48

Reactions analogous to that described in Example 43 were carried out except that the final temperature of the ester exchange reaction was changed. The results are shown in Table 13.

TABLE 13

| Example No. | final temperature (°C.) | logarithmic viscosity | fluidity starting temperature (°C.) | TGA (°C.) |
|---|---|---|---|---|
| 47 | 225 | 0.318 | 210 | 414.3 |
| 48 | 275 | 0.411 | 217 | 409.2 |

EXAMPLES 49, 50

Reactions analogous to that described in Example 43 were carried out except that the final temperature of the polycondensation reaction was changed. The results are shown in Table 14.

TABLE 14

| Example No. | final temperature (°C.) | logarithmic viscosity | fluidity starting temperature (°C.) | TGA (°C.) |
|---|---|---|---|---|
| 49 | 300 | 0.408 | 230 | 410.0 |
| 50 | 350 | — | 245 | 412.1 |

EXAMPLE 51

A reaction analogous to that described in Example 43 was carried out except that the catalyst for the ester exchange reaction was changed. The results are shown in Table 15.

TABLE 15

| Example No. | catalyst | logarithmic viscosity | fluidity starting temperature (°C.) | TGA (°C.) |
|---|---|---|---|---|
| 51 | Sn(CH$_3$CH$_2$CH$_2$CH$_2$)$_2$O | 0.398 | 232 | 410.2 |

EXAMPLES 52.53

Reactions analogous to that described in Example 43 were carried out except that butandiol or cyclohexane dimethanol was used instead of ethylene glycol. The results are shown in Table 16.

TABLE 16

| Example No. | diol | logarithmic viscosity | fluidity starting temperature (°C.) | TGA (°C.) |
|---|---|---|---|---|
| 52 | butanediol | 0.493 | 205 | 407.9 |
| 53 | cyclohexane dimethanol | 0.560 | 187 | 410.1 |

EXAMPLES 54.55

Reactions analogous to that described in Example 43 were carried out except that 4,4'-biphenyl dicarboxylic acid or 2,6-naphthalene dicarboxylic acid was used instead of terephthalic acid. The results are shown in Table 17.

TABLE 17

| Example No. | aromatic dicarboxylic acid | logarithmic viscosity | fluidity starting temperature (°C.) | TGA (°C.) |
|---|---|---|---|---|
| 54 | 4,4'-biphenyl dicarboxylic acid | — | 268 | 429.7 |
| 55 | 2,6-nephthalene dicarboxylic acid | — | 257 | 433.1 |

EXAMPLES 56

A reaction analogous to that described in Example 43 was carried out except that the amount of p-acetoxy benzoic acid was changed. The results are shown in Table 18.

TABLE 18

| Example No. | p-acetoxy benzoic acid (mol) | logarithmic viscosity | fluidity starting temperature (°C.) | TGA (°C.) |
|---|---|---|---|---|
| 54 | 0.8 | 1.133 | 289 | 429.8 |

We claim:

1. A method of producing a thermotropic liquid crystalline polyester, comprising the step of carrying out a polycondensation of an ester monomer represented by the formula I-2, an aromatic dicarboxylic acid compound represented by the formula II, wherein the molar ratio of I-2/II ranges from 0.9 to 1.1, and an aromatic carboxylic acid compound represented by the formula III-2, the amount of which is not more than 20 times that of the ester monomer by mole:

(wherein, Ar$^1$, Ar$^2$, and Ar$^3$ are independently aromatic hydrocarbon groups of C6–18 which are unsubstituted or bear a member selected from the group consisting of an alkyl group, alkoxy group, phenyl group and halogen atom, R$^1$ is a saturated aliphatic hydrocarbon of C1–15, R$^2$ and R$^3$ are independently a hydrocarbon group of C1–6, X$^1$, X$^2$ and X$^3$ are independently a hydrogen atom or a saturated hydrocarbon group of C1–10).

2. A method of producing a thermotropic liquid crystalline polyester comprising the step of carrying out a polycondensation by reacting an ester monomer represented by the formula I, an aromatic dicarboxylic acid compound represented by the formula II, wherein the molar amount of I/II ranges from 0.9 to 1.1, an aromatic carboxylic acid compound represented by the formula III, the amount of which is not more than 20 times that of the ester monomer by mole, and an aliphatic carboxylic acid anhydride:

(wherein Ar$^1$, Ar$^2$, and Ar$^3$ are independently aromatic hydrocarbon groups of C6–18, unsubstituted or substituted with a member selected from the group consisting of an alkyl group, alkoxyl group, phenyl group and halogen atom, R$^1$ is a saturated aliphatic hydrocarbon group of C1–15, X$^1$, X$^2$ and X$^3$ are independently a hydrogen atom or a saturated hydrocarbon group of C1–10, X$^4$ and X$^5$ are independently a hydrogen atom or a group expressed as R$^4$—CO— (wherein R$^4$ is a hydrocarbon group of C1–6), and at least one of X$^4$ and X$^5$ is a hydrogen atom).

3. The method of claim 1 wherein the amount of said aromatic carboxylic acid compound represented by the following formula [III-2] to be used is 0.3–17 times that of the ester monomer of the formula [I-2], by mole.

4. The method of claim 2 wherein the amount of said aromatic carboxylic acid compound of the formula [III] to be used is 0.3–17 times that of the ester monomer of the formula [I] by mole.

* * * * *